Figure 1:
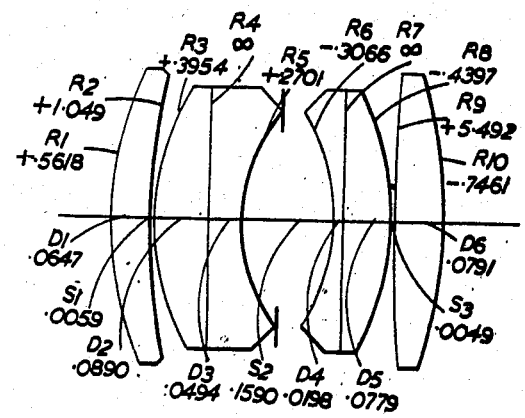

May 30, 1944.  A. WARMISHAM ET AL  2,349,893
OPTICAL OBJECTIVES
Filed Jan. 2, 1943

INVENTORS
A. WARMISHAM,
C. G. WYNNE
BY
ATTORNEYS

Patented May 30, 1944

2,349,893

UNITED STATES PATENT OFFICE 2,349,893

OPTICAL OBJECTIVE

Arthur Warmisham and Charles Gorrie Wynne, Leicester, England, assignors to Taylor, Taylor & Hobson Limited, Leicester, England, a company of Great Britain Application January 2, 1943, Serial No. 471,142
In Great Britain November 27, 1941

21 Claims. (Cl. 88—57)

This invention relates to an optical objective for photographic or other purposes of the kind corrected for spherical and chromatic aberrations, coma, astigmatism, field curvature and distortion, and comprising two compound divergent meniscus components located between two simple convergent components and each having a divergent element cemented to a convergent element.

The invention has for its object to provide an objective of this kind well-corrected over a wider angle of view than hitherto.

In the objective according to the invention the two divergent elements are made of potassium bromide crystal. Preferably the paraxial secondary spectrum is reversed as compared with that for usual objectives of the above-mentioned kind, that is to say the paraxial focus at the two ends of the visible spectrum is short of a maximum value occurring in the neighbourhood of the C-line, whereas in known objectives the paraxial focus at the ends is beyond a minimum value at an intermediate point of the spectrum. Preferably the average value of the Abbé $\nu$ numbers for the four convergent elements of the objective is not greater than 49, and not less than 42.

To express the desired results mathematically, it is convenient to make use of a mathematical expression representing the contribution of an individual surface to secondary spectrum, namely the expression $$EQH_2\left(\frac{\delta N}{N}-\frac{\delta n}{n}\right)$$

wherein E is the equivalent focal length of the objective and the remaining terms are all related to any one particular surface of the objective and may be defined as follows: N is the mean refractive index for the D-line of the material on the emergent side of the surface, and $n$ that of the material on the incident side of the surface; $\delta N$ is the difference in refractive index between the C and F lines for the material on the emergent side, and $\delta n$ the corresponding difference for the material on the incident side; H is the ratio of the incident height at the surface to the incident height at the front surface of the objective of a paraxial ray traversing the objective; and Q is defined by $$\left(\frac{1}{r}-\frac{1}{s}\right)n$$

wherein $r$ is the radius of curvature of the surface and $s$ is the axial distance from the surface of the axial intersection of the paraxial ray on the incident side.

If now the letter S be used for brevity to represent the above expression, and numerical suffixes be used to indicate individual surfaces counting from the front, than we have for the two cemented surfaces.

$$S_4=EQ_4H_4^2\left(\frac{\delta N_4}{N_4}-\frac{\delta n_4}{n_4}\right)$$

and $$S_7=EQ_7H_7^2\left(\frac{\delta N_7}{N_7}-\frac{\delta n_7}{n_7}\right)$$

In order to obtain the desired results the algebraic sum of $S_4$ and $S_7$ should preferably lie between —.005 and —.015. It is also preferable that the algebraic sum of $S_4'$ and $S_7'$ should be numerically less than that of $S_4$ and $S_7$, where the expression S' differs from S solely in the substitution of the terms $\delta'N$ and $\delta'n$ for $\delta N$ and $\delta n$, $\delta'N$ being the difference in refractive index between the $e$ and $g$ lines for the material on the emergent side of the surface $\delta'n$ the corresponding difference for the material on the incident side.

Utilising a different method of calculation it is also possible to obtain the desired results if the algebraic sum of the reciprocals of the radii of curvature of the two cemented surfaces of the objective (reckoned as positive if concave to the diaphragm and negative if convex to the diaphragm) is numerically less than half the equivalent power of the objective.

Conveniently the rear surface of the convergent front component is convex to the front and has a radius of curvature lying between .85 and 1.6 times the equivalent focal length of the objective.

In one convenient arrangement the convergent element in one of the divergent components (preferably the front divergent component) is made of a dense barium crown glass, while dense flint or dense barium flint glasses are used for the other convergent elements. In another arrangement all four convergent elements are made of dense barium flint glasses.

Figure 2:
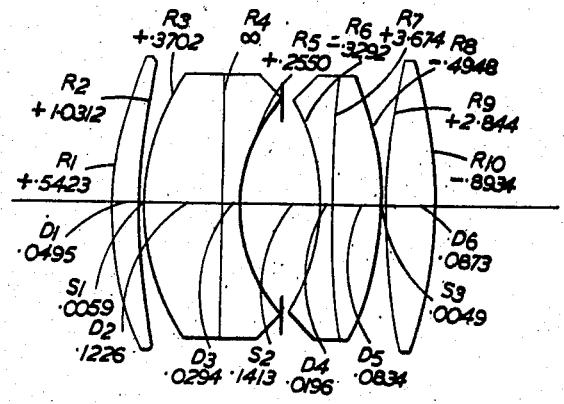
Figure 3:
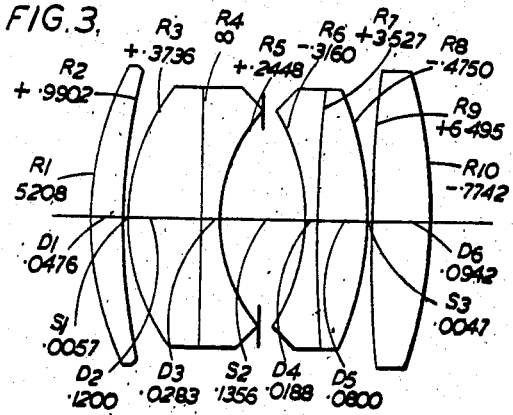

Numerical data for three convenient practical examples of objective according to the invention, as illustrated in the accompanying drawing, wherein Figs. 1, 2 and 3 are partially schematic views of various modifications of the inventive concept as described in the appended examples, are given in the following tables in which $R_1$, $R_2$ . . . represent the radii of curvature of the individual lens surfaces counting from the front (the positive sign indicating that the surface is convex to the front and the negative sign that it is concave thereto), $D_1$, $D_2$ ... represent the axial thicknesses of the various elements, and $S_1$, $S_2$, $S_3$ represent the axial air separations between the components. The tables also give the mean refractive indices of the Abbé $\nu$ numbers of the materials used for the individual elements of the objective.

Example I

Equivalent focal length 1.000. Relative aperture F/2.0

| Radius | Thickness or air separation | Refractive index $n_D$ | Abbé $\nu$ number |
|---|---|---|---|
| $R_1 = +.5618$ | | | |
| | $D_1 = .0647$ | 1.652 | 33.5 |
| $R_2 = +1.049$ | | | |
| | $S_1 = .0059$ | | |
| $R_3 = +.3954$ | | | |
| | $D_2 = .0890$ | 1.6128 | 56.3 |
| $R_4 = \infty$ | | | |
| | $D_3 = .0494$ | 1.558 | 31.5 |
| $R_5 = +.2701$ | | | |
| | $S_2 = .1590$ | | |
| $R_6 = -.3066$ | | | |
| | $D_4 = .0198$ | 1.558 | 31.5 |
| $R_7 = \infty$ | | | |
| | $D_5 = .0779$ | 1.644 | 48.3 |
| $R_8 = -.4397$ | | | |
| | $S_3 = .0049$ | | |
| $R_9 = +5.492$ | | | |
| | $D_6 = .0791$ | 1.6529 | 46.2 |
| $R_{10} = -.7461$ | | | |

Example II

Equivalent focal length 1.000. Relative aperture F/2.0

| Radius | Thickness or air separation | Refractive index $n_D$ | Abbé $\nu$ number |
|---|---|---|---|
| $R_1 = +.5423$ | | | |
| | $D_1 = .0495$ | 1.652 | 33.5 |
| $R_2 = +1.0312$ | | | |
| | $S_1 = .0059$ | | |
| $R_3 = +.3702$ | | | |
| | $D_2 = .1226$ | 1.6128 | 57.6 |
| $R_4 = \infty$ | | | |
| | $D_3 = .0294$ | 1.558 | 31.5 |
| $R_5 = +.2550$ | | | |
| | $S_2 = .1413$ | | |
| $R_6 = -.3292$ | | | |
| | $D_4 = .0196$ | 1.558 | 31.5 |
| $R_7 = +3.674$ | | | |
| | $D_5 = .0834$ | 1.644 | 48.3 |
| $R_8 = -.4948$ | | | |
| | $S_3 = .0049$ | | |
| $R_9 = +2.844$ | | | |
| | $D_6 = .0873$ | 1.6529 | 46.2 |
| $R_{10} = -.8934$ | | | |

Example III

Equivalent focal length 1.000. Relative aperture F/2.0

| Radius | Thickness or air separation | Refractive index $n_D$ | Abbé $\nu$ number |
|---|---|---|---|
| $R_1 = +.5208$ | | | |
| | $D_1 = .0476$ | 1.6529 | 46.2 |
| $R_2 = +.9902$ | | | |
| | $S_1 = .0057$ | | |
| $R_3 = +.3736$ | | | |
| | $D_2 = .1200$ | 1.644 | 48.3 |
| $R_4 = \infty$ | | | |
| | $D_3 = .0283$ | 1.558 | 31.5 |
| $R_5 = +.2448$ | | | |
| | $S_2 = .1356$ | | |
| $R_6 = -.3160$ | | | |
| | $D_4 = .0188$ | 1.558 | 31.5 |
| $R_7 = +3.527$ | | | |
| | $D_5 = .0800$ | 1.644 | 48.3 |
| $R_8 = -.4750$ | | | |
| | $S_3 = .0047$ | | |
| $R_9 = +6.495$ | | | |
| | $D_6 = .0942$ | 1.6529 | 46.2 |
| $R_{10} = -.7742$ | | | |

It will be noticed that in all these examples the radius $R_2$ lies between .85 and 1.6, and that the average Abbé $\nu$ number for the convergent elements is 46.1 in Example I, 46.4 in Example II and 47.25 in Example III. In Examples I and II dense barium crown glass is used for the convergent element in the front divergent component and dense flint glass for the simple front component, whilst the other two convergent elements are both made of dense barium flint glass. In Example III all four convergent elements are made of dense barium flint glass.

The algebraic sum of the reciprocals of the $R_4$ and $R_7$ (reckoned as negative if convex to the diaphragm) is zero in Example I, and is about $-.27$ in Example II and $-.28$ in Example III.

The algebraic sum of $S_4$ and $S_7$ is $-.00985$ in Example I, $-.01029$ in Example II and $-.00795$ in Example III. The algebraic sum of $S_4'$ and $S_7'$ is $-.00973$ in Example I, $-.01017$ in Example II and $-.00746$ in Example III.

All three examples give a reversed secondary spectrum. Thus, for instance, in Example II the paraxial back focus is .70128 for the b-line (7065), .70187 for the C-line (6563), .70131 for the d-line (5875), and .70067 for the g-line (4359). All three examples are well corrected for all the aberrations over a semi-angular field of 25°.

In all three examples the diaphragm is axially spaced behind the surface $R_5$ by a distance .073 times the equivalent focal length of the objective, the diameter of the diaphragm being in Example I .369, in Example II .361 and in Example III .360 times such equivalent focal length.

It will be appreciated that these examples have been given by way of example only and that the invention may be carried into practice in other ways.

What we claim as our invention and desire to secure by Letters Patent is:

1. An optical objective corrected for spherical and chromatic aberrations, coma, astigmatism, field curvature and distortion, and comprising a diaphragm and four components in axial alignment, two on either side of the diaphragm, of which the two outer components are simple and convergent and the two inner are compound divergent meniscus components each having a divergent element cemented to a convergent element, wherein the objective has a reversed paraxial secondary spectrum and the two divergent elements are made of potassium bromide crystal, while the average value of the Abbé $\nu$ numbers of the materials used for the four convergent elements is not greater than 49.0, and not less than 42.0.

2. An optical objective corrected for spherical and chromatic aberrations, coma, astigmatism, field curvature and distortion, and comprising a diaphragm and four components in axial alignment, two on either side of the diaphragm, of which the two outer components are simple and convergent and the two inner are compound divergent meniscus components each having a divergent element cemented to a convergent element, wherein the objective has a reversed paraxial secondary spectrum and the two divergent elements are made of potassium bromide crystal, while the algebraic sum of $S_4$ and $S_7$, which are the values of S respectively for the two cemented surfaces that is the fourth and seventh surfaces counting from the front, lies between $-.005$ and $-.015$, wherein S is an expression representing the contribution of any one individual surface to the secondary spectrum and is defined by the equation $$S = EQH^2\left(\frac{\delta N}{N} - \frac{\delta n}{n}\right)$$

where E is the equivalent focal length of the whole objective, and the remaining terms are all related to the individual surface and are defined as follows: N is the means refractive index for the D-line of the material on the emergent side of the surface and $n$ that of the material on the incident side of the surface, $\delta N$ is the difference in refractive index between the C and F lines for the material on the emergent side and $\delta n$ the corresponding difference for the material on the incident side, H is the ratio of the incident height at the surface to the incident height at the front surface of the objective of a paraxial ray traversing the objective, and Q represents the expression $$\left(\frac{1}{r}-\frac{1}{s}\right)n$$

where $r$ is the radius of curvature of the surface and $s$ is the axial distance from the surface of the axial intersection of the paraxial ray on the incident side.

3. An optical objective corrected for spherical and chromatic aberrations, coma, astigmatism, field curvature and distortion, and comprising a diaphragm and four components in axial alignment, two on either side of the diaphragm, of which the two outer components are simple and convergent and the two inner are compound divergent meniscus components, each having a divergent element cemented to a convergent element, wherein the objective has a reversed paraxial secondary spectrum and the two divergent elements are made of potassium bromide crystal, while the algebraic sum of $S_4$ and $S_7$, which are the values of S respectively for the fourth and seventh surfaces counting from the front, lies between $-.005$ and $-.015$ and is numerically greater than the algebraic sum of $S_4'$ and $S_7'$, which are respectively the values of S' for the fourth and seventh surfaces, wherein S and S' are expressions representing the contribution of any one individual surface to the secondary spectrum and are defined by the equations $$S=EQH^2\left(\frac{\delta N}{N}-\frac{\delta n}{n}\right)$$

and $$S'=EQH^2\left(\frac{\delta'N}{N}-\frac{\delta'n}{n}\right)$$

where E is the equivalent focal length of the whole objective, and the remaining terms are all related to the individual surface and are defined as follows, N is the mean refractive index for the D-line of the material on the emergent side of the surface and $n$ that of the material on the incident side of the surface, $\delta N$ is the difference in refractive index between the C and F lines for the material on the emergent side and $\delta n$ the corresponding difference for the material on the incident side, $\delta'N$ is the difference in refractive index between the $e$ and $g$ lines for the material on the emergent side and $\delta'n$ the corresponding difference for the material on the incident side, H is the ratio of the incident height at the surface to the incident height at the front surface of the objective of a paraxial ray traversing the objective, and Q represents the expression $$\left(\frac{1}{r}-\frac{1}{s}\right)n$$

where $r$ is the radius of curvature of the surface and S is the axial distance from the surface of the axial intersection of the paraxial ray on the incident side.

4. An optical objective as claimed in claim 2, in which the average value of the Abbé $\nu$ numbers of the materials used for the four convergent elements is not greater than 49.0 and not less than 42.0

5. An optical objective corrected for spherical and chromatic aberrations, coma, astigmatism, field curvature and distortion, and comprising a diaphragm and four components in axial alignment, two on either side of the diaphragm, of which the two outer components are simple and convergent and the two inner are compound divergent meniscus components each having a divergent element cemented to a convergent element, wherein the objective has a reversed paraxial secondary spectrum and the two divergent elements are made of potassium bromide crystal, while the average value of the Abbé $\nu$ numbers of the materials used for the four convergent elements is not greater than 49.0 nor less than 42.0 and the algebraic sum of the reciprocals of the radii of curvature of the two cemented surfaces (reckoned as positive if concave to the diaphragm and negative if convex thereto) is numerically less than half the equivalent power of the objective.

6. An optical objective as claimed in claim 3, in which the average value of the Abbé $\nu$ numbers of the materials used for the four convergent elements is not greater than 49.0 and not less than 42.0 and the algebraic sum of the reciprocals of the radii of curvature of the two cemented surfaces (reckoned as positive if concave to the diaphragm and negative if convex thereto) is numerically less than half the equivalent power of the objective.

7. An optical objective as claimed in claim 1, in which the rear surface of the front convergent element is convex to the front and has a radius of curvature lying between .85 and 1.6 times the equivalent focal length of the objective.

8. An optical objective as claimed in claim 2, in which the rear surface of the front convergent element is convex to the front and has a radius of curvature lying between .85 and 1.6 times the equivalent focal length of the objective.

9. An optical objective as claimed in claim 3, in which the rear surface of the front convergent element is convex to the front and has a radius of curvature lying between .85 and 1.6 times the equivalent focal length of the objective.

10. An optical objective as claimed in claim 5, in which the rear surface of the front convergent element is convex to the front and has a radius of curvature lying between .85 and 1.6 times the equivalent focal length of the objective.

11. An optical objective as claimed in claim 1, in which a dense barium crown glass is used for the convergent element in one of the divergent components and the other three convergent elements are made of dense flint glasses.

12. An optical objective as claimed in claim 2, in which a dense barium crown glass is used for the convergent element in one of the divergent components and the other three convergent elements are made of dense flint glasses.

13. An optical objective as claimed in claim 3, in which a dense barium crown glass is used for the convergent element in one of the divergent components and the other three convergent elements are made of dense flint glasses.

14. An optical objective as claimed in claim 5, in which a dense barium crown glass is used for the convergent element in one of the divergent components and the other three convergent elements are made of dense flint glasses.

15. An optical objective as claimed in claim 1, in which the four convergent elements are all made of dense barium flint glasses.

16. An optical objective as claimed in claim 2, in which the four convergent elements are all made of dense barium flint glasses.

17. An optical objective as claimed in claim 3, in which the four convergent elements are all made of dense barium flint glasses.

18. An optical objective as claimed in claim 5, in which the four convergent elements are all made of dense barium flint glasses.

19. An optical objective having numerical data substantially as set forth in the following table wherein R represents the radius of curvature of the individual lens surfaces counting from the front, (the positive sign (+) indicating that the surface is convex to the front and the negative sign (—) that it is concave thereto), D represents the axial thickness of the various elements and S represents the axial air separation between the components:

Equivalent focal length 1.000.   Relative aperture F/2.0

| Radius | Thickness or air separation | Refractive index $n_D$ | Abbé $\nu$ number |
|---|---|---|---|
| $R_1=+.5618$ | $D_1=.0647$ | 1.652 | 33.5 |
| $R_2=+1.049$ | | | |
| $R_3=+.3954$ | $S_1=.0059$ | | |
| | $D_2=.0890$ | 1.6128 | 56.3 |
| $R_4=\infty$ | $D_3=.0494$ | 1.558 | 31.5 |
| $R_5=+.2701$ | $S_2=.1590$ | | |
| $R_6=-.3066$ | $D_4=.0198$ | 1.558 | 31.5 |
| $R_7=\infty$ | $D_5=.0779$ | 1.644 | 48.3 |
| $R_8=-.4397$ | $S_3=.0049$ | | |
| $R_9=+5.492$ | $D_6=.0791$ | 1.6529 | 46.2 |
| $R_{10}=-.7461$ | | | |

20. An optical objective having numerical data substantially as set forth in the following table wherein R represents the radius of curvature of the individual lens surfaces counting from the front, (the positive sign (+) indicating that the surface is convex to the front and the negative sign (—) that it is concave thereto), D represents the axial thickness of the various elements and S represents the axial air separation between the components:

Equivalent focal length 1.000.   Relative aperture F/2.0

| Radius | Thickness or air separation | Refractive index $n_D$ | Abbé $\nu$ number |
|---|---|---|---|
| $R_1=+.5423$ | $D_1=.0495$ | 1.652 | 33.5 |
| $R_2=+1.0312$ | $S_1=.0059$ | | |
| $R_3=+.3702$ | $D_2=.1226$ | 1.6128 | 57.6 |
| $R_4=\infty$ | $D_3=.0294$ | 1.558 | 31.5 |
| $R_5=+.2550$ | $S_2=.1413$ | | |
| $R_6=-.3292$ | $D_4=.0196$ | 1.558 | 31.5 |
| $R_7=+3.674$ | $D_5=.0834$ | 1.644 | 48.3 |
| $R_8=-.4948$ | $S_3=.0049$ | | |
| $R_9=+2.844$ | $D_6=.0873$ | 1.6529 | 46.2 |
| $R_{10}=-.8934$ | | | |

21. An optical objective having numerical data substantially as set forth in the following table wherein R represents the radius of curvature of the individual lens surfaces counting from the front, (the positive sign (+) indicating that the surface is convex to the front and the negative sign (—) that it is concave thereto), D represents the axial thickness of the various elements and S represents the axial air separation between the components:

Equivalent focal length 1.000.   Relative aperture F/2.0

| Radius | Thickness or air separation | Refractive index $n_D$ | Abbé $\nu$ number |
|---|---|---|---|
| $R_1=+.5208$ | $D_1=.0476$ | 1.6529 | 46.2 |
| $R_2=+.9902$ | $S_1=.0057$ | | |
| $R_3=+.3736$ | $D_2=.1200$ | 1.644 | 48.3 |
| $R_4=\infty$ | $D_3=.0283$ | 1.558 | 31.5 |
| $R_5=+.2448$ | $S_2=.1356$ | | |
| $R_6=-.3160$ | $D_4=.0188$ | 1.558 | 31.5 |
| $R_7=+3.527$ | $D_5=.0800$ | 1.644 | 48.3 |
| $R_8=-.4750$ | $S_3=.0047$ | | |
| $R_9=+6.495$ | $D_6=.0942$ | 1.6529 | 46.2 |
| $R_{10}=-.7742$ | | | |

ARTHUR WARMISHAM.
CHARLES GORRIE WYNNE.